(12) United States Patent
Kato et al.

(10) Patent No.: US 12,703,803 B2
(45) Date of Patent: Aug. 11, 2026

(54) LAMINATE INCLUDING SURFACE LAYER HAVING SCRATCH RESISTANCE AND MATTE PROPERTIES AND SURFACE COATING COMPOSITION

(71) Applicant: 3M INNOVATIVE PROPERTIES COMPANY, St. Paul, MN (US)

(72) Inventors: Keisuke Kato, Yamagata (JP); Shinsuke Kondo, Yamagata (JP); Ken Egashira, Kanagawa (JP); Naota Sugiyama, St. Paul, MN (US); Yorinobu Takamatsu, Kanagawa (JP); Yusaku Yoshiike, Kanagawa (JP); Masaaki Furusawa, Yamagata (JP)

(73) Assignee: 3M Innovative Properties Company, St. Paul, MN (US)

(*) Notice: Subject to any disclaimer, the term of this patent is extended or adjusted under 35 U.S.C. 154(b) by 503 days.

(21) Appl. No.: 18/035,964

(22) PCT Filed: Nov. 22, 2021

(86) PCT No.: PCT/IB2021/060826

§ 371 (c)(1),
(2) Date: May 9, 2023

(87) PCT Pub. No.: WO2022/112926

PCT Pub. Date: Jun. 2, 2022

(65) Prior Publication Data

US 2024/0018371 A1 Jan. 18, 2024

(30) Foreign Application Priority Data

Nov. 26, 2020 (JP) ................................ 2020-196142

(51) Int. Cl.

| | |
|---|---|
| ***C09D 7/65*** | (2018.01) |
| ***B32B 27/08*** | (2006.01) |

(Continued)

(52) U.S. Cl.

CPC ................ *C09D 7/65* (2018.01); *B32B 27/08* (2013.01); *B32B 27/22* (2013.01); *B32B 27/304* (2013.01);

(Continued)

(58) Field of Classification Search

CPC .......... C09D 7/65; C09D 5/00; C09D 5/1637; C09D 7/42; C09D 7/69; C09D 175/04;

(Continued)

(56) References Cited

U.S. PATENT DOCUMENTS

2009/0111935 A1* 4/2009 Fujii .................. C09D 175/04 524/507
2011/0136976 A1 6/2011 Nakamura (Continued)

FOREIGN PATENT DOCUMENTS

CN 111983745 B 10/2022
JP 2007230049 A 9/2007

(Continued)

OTHER PUBLICATIONS

International Search Report for PCT International Application No. PCT/IB2021/060826, mailed on Feb. 1, 2022, 3 pages.

*Primary Examiner* — Doris L Lee
(74) *Attorney, Agent, or Firm* — Lance Vietzke

(57) ABSTRACT

Provided is a laminate including a surface layer that has excellent matte properties and can obtain good results in both the needle scratch test and the nail scratch test, and a surface coating composition that can prepare such a surface layer.

15 Claims, 4 Drawing Sheets

(51) Int. Cl.

| | |
|---|---|
| ***B32B 27/22*** | (2006.01) |
| ***B32B 27/30*** | (2006.01) |
| ***B32B 27/36*** | (2006.01) |
| ***C09D 5/00*** | (2006.01) |
| ***C09D 5/16*** | (2006.01) |
| ***C09D 7/40*** | (2018.01) |
| ***C09D 7/42*** | (2018.01) |
| ***C09D 175/04*** | (2006.01) |

(52) U.S. Cl.

CPC ................ *B32B 27/36* (2013.01); *C09D 5/00* (2013.01); *C09D 5/1637* (2013.01); *C09D 7/42* (2018.01); *C09D 7/69* (2018.01); *C09D 175/04* (2013.01); *B32B 2255/10* (2013.01); *B32B 2255/26* (2013.01); *B32B 2307/408* (2013.01); *B32B 2307/584* (2013.01); *B32B 2451/00* (2013.01)

(58) Field of Classification Search

CPC ....... B32B 27/08; B32B 27/22; B32B 27/304; B32B 27/36; B32B 2255/10; B32B 2255/26; B32B 2307/408; B32B 2307/584; B32B 2451/00; B32B 27/20; B32B 2250/246; B32B 2270/00; B32B 3/30; B32B 2264/108; B32B 2307/4026; B32B 27/308; C08G 18/44; C08G 18/706; C08G 18/80; C08G 18/797; C08J 7/046

See application file for complete search history.

(56) References Cited

U.S. PATENT DOCUMENTS

| | | | | |
|---|---|---|---|---|
| 2020/0116940 | A1 | 4/2020 | Seyedi et al. | |
| 2020/0239729 | A1 | 7/2020 | Sugiyama et al. | |
| 2021/0061968 | A1 * | 3/2021 | Kondo | C08G 18/10 |
| 2021/0348002 | A1 * | 11/2021 | Wakabayashi | C09D 7/70 |
| 2022/0363808 | A1 * | 11/2022 | Yamauchi | C08G 18/44 |

FOREIGN PATENT DOCUMENTS

| | | | | |
|---|---|---|---|---|
| JP | 2011006566 | A | 1/2011 | |
| JP | 4731357 | B2 | 7/2011 | |
| JP | 2012179527 | A | 9/2012 | |
| JP | 2012219221 | A | 11/2012 | |
| JP | 2017171910 | A | 9/2017 | |
| JP | 2017177405 | A | 10/2017 | |
| JP | 2018051942 | A | 4/2018 | |
| JP | 2018159052 | A | 10/2018 | |
| JP | 2019072935 | A | 5/2019 | |
| JP | 2019085510 | A | 6/2019 | |
| JP | 2019123782 | A | 7/2019 | |
| JP | 2020050816 | A | 4/2020 | |
| JP | 2020083902 | A | 6/2020 | |
| JP | 2020186332 | A | 11/2020 | |
| KR | 20180034156 | A | 4/2018 | |
| WO | 2017150421 | A1 | 9/2017 | |
| WO | 2017168980 | A1 | 10/2017 | |
| WO | 2018110251 | A1 | 6/2018 | |
| WO | WO-2019138397 | A1 * | 7/2019 | B32B 23/20 |
| WO | 2020055290 | A1 | 3/2020 | |
| WO | 2020076015 | A1 | 4/2020 | |
| WO | 2020079556 | A1 | 4/2020 | |

* cited by examiner

LAMINATE INCLUDING SURFACE LAYER HAVING SCRATCH RESISTANCE AND MATTE PROPERTIES AND SURFACE COATING COMPOSITION

CROSS REFERENCE TO RELATED APPLICATIONS

This application is a national stage filing under 35 U.S.C. 371 of PCT/IB2021/060826, filed Nov. 22, 2021, which claims the benefit of JP Application No. 2020-196142, filed Nov. 26, 2020, the disclosure of which is incorporated by reference in its/their entirety herein.

TECHNICAL FIELD

The present disclosure relates to a laminate including a surface layer having scratch resistance and matte properties, and a surface coating composition.

BACKGROUND ART

In recent years, a film having a low gloss appearance and scratch resistance has been developed.

Patent Document 1 (JP 2019-123782 A) discloses a scratch resistant film including a surface layer, the surface layer including a binder comprising a urethane resin; urethane resin beads having an average particle size from 3 micrometers to 30 micrometers; and hard particles having an average particle size from 5 micrometers to 45 micrometers; and nano silica particles, wherein the surface layer comprises from 30 parts by mass to 500 parts by mass of the hard particles based on 100 parts by mass of the binder, and the gloss of the surface layer is 5.5 GU or less at 60 degrees.

Patent Document 2 (JP 2019-072935 A) discloses a stretchable film including a surface layer, the surface layer containing a binder containing a urethane resin; urethane resin beads having an average particle size from 4 micrometers to 20 micrometers; and nano silica particles, wherein a surface glossiness of the stretchable film is 5 GU or less at 60 degrees.

CITATION LIST

Patent Literature

Patent Document 1: JP 2019-123782 A
Patent Document 2: JP 2019-072935 A

SUMMARY OF INVENTION

Technical Problem

As a test for evaluating scratch resistance, a pencil hardness test as disclosed in Patent Document 1, a steel wool abrasion test, a needle scratch test using a steel needle, a nail scratch test, and the like as disclosed in Patent Document 2 have been known.

Since fracture modes in these tests are different from each other, even if good results are obtained in, for example, a pencil hardness test or a needle scratch test, good results cannot be obtained in the nail scratch test; or vice versa, even if good results were obtained in the nail scratch test, good results were not obtained in the pencil hardness test or the needle scratch test.

The present disclosure provides a laminate including a surface layer that has excellent matte properties and that can obtain good results in both the needle scratch test and the nail scratch test, and a surface coating composition that can prepare such a surface layer.

Solution to Problem

According to an embodiment of the present disclosure, there is provided a laminate including a substrate; and a surface layer having scratch resistance and matte properties that includes resin beads having an average particle size of approximately 1 micrometer or greater and approximately 20 micrometers or less, and having a glass transition temperature of higher than approximately −30° C. and lower than approximately 34° C., and a binder, wherein the surface layer contains the resin beads of less than approximately 75% by mass based on a total weight of the surface layer, and exhibits an elastic modulus of approximately 65 MPa or less in a region other than the resin beads of the surface layer when the elastic modulus of the surface layer is measured using an atomic force microscope.

According to another embodiment of the present disclosure, there is provided a surface coating composition including resin beads having an average particle size of approximately 1 micrometer or greater and approximately 20 micrometers or less and a glass transition temperature of higher than approximately −30° C. and lower than approximately 34° C., and a binder precursor, wherein the surface layer that contains the resin beads of less than approximately 75% by mass based on solid content of 100 parts by mass of the surface coating composition, and that is formed of the surface coating composition exhibits an elastic modulus of approximately 65 MPa or less in a region other than the resin beads of the surface layer when the elastic modulus of the surface layer is measured using an atomic force microscope.

Advantageous Effects of Invention

According to the present disclosure, it is possible to provide a laminate including a surface layer that has excellent matte properties and that can obtain good results in both the needle scratch test and the nail scratch test, and a surface coating composition that can prepare such a surface layer.

The above description should not be construed as disclosing all embodiments of the present invention and all advantages relating to the present invention.

DESCRIPTION OF EMBODIMENTS

Figure 1:
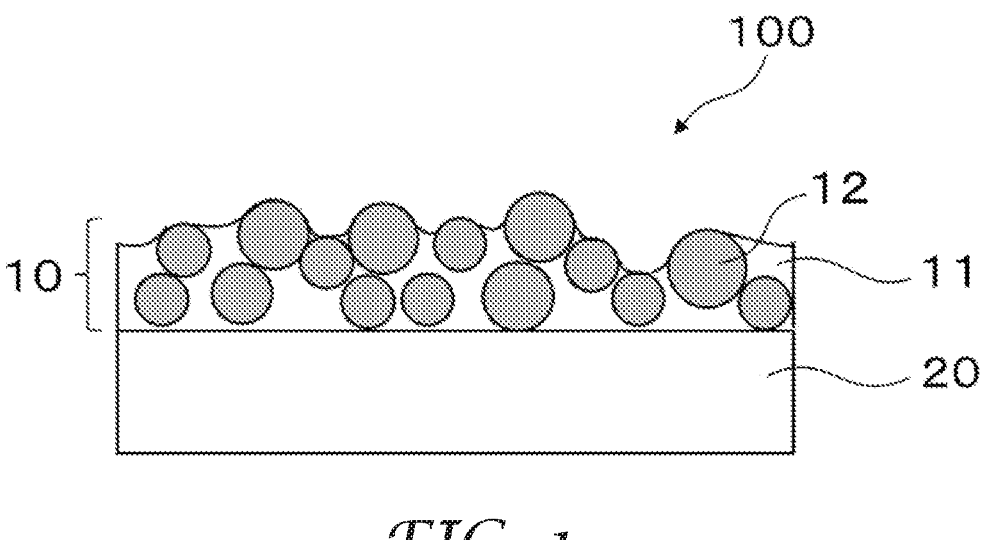
FIG. 1 is a schematic cross-sectional view of a laminate of an embodiment of the present invention.
Figures 2A, 2B:
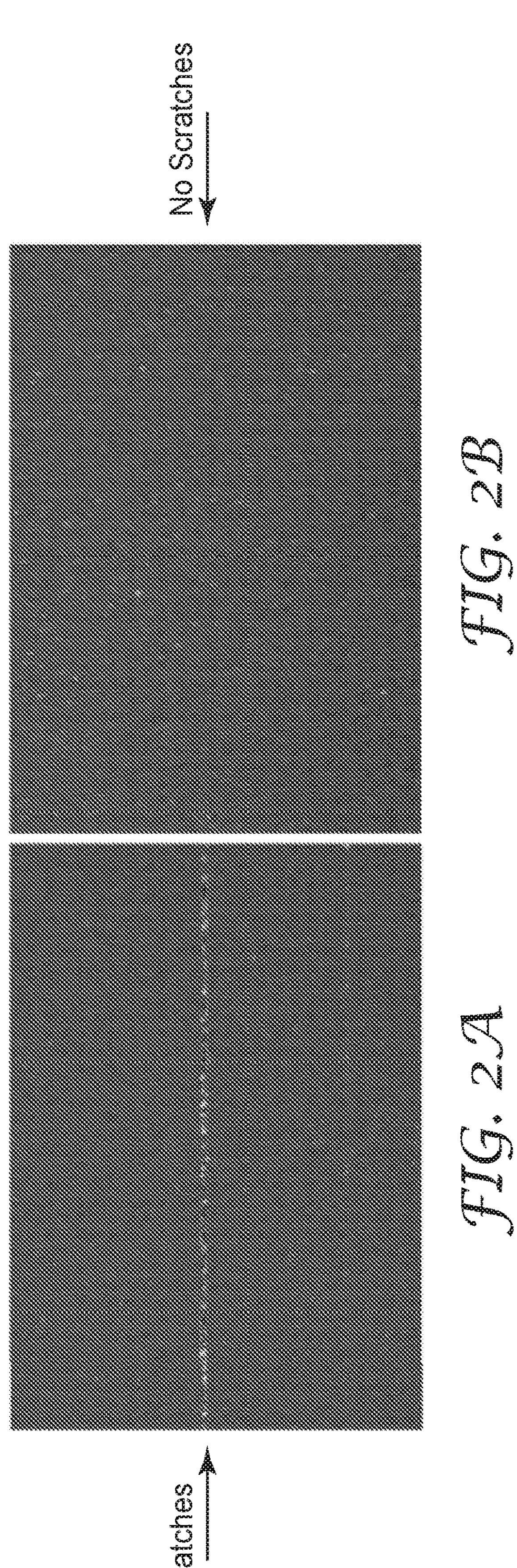
FIG. 2(*a*) is a photograph after a needle scratch test of a laminate of Comparative Example 3, and FIG. 2(*b*) is a photograph after a needle scratch test of a laminate of Example 1.
Figures 3A, 3B:
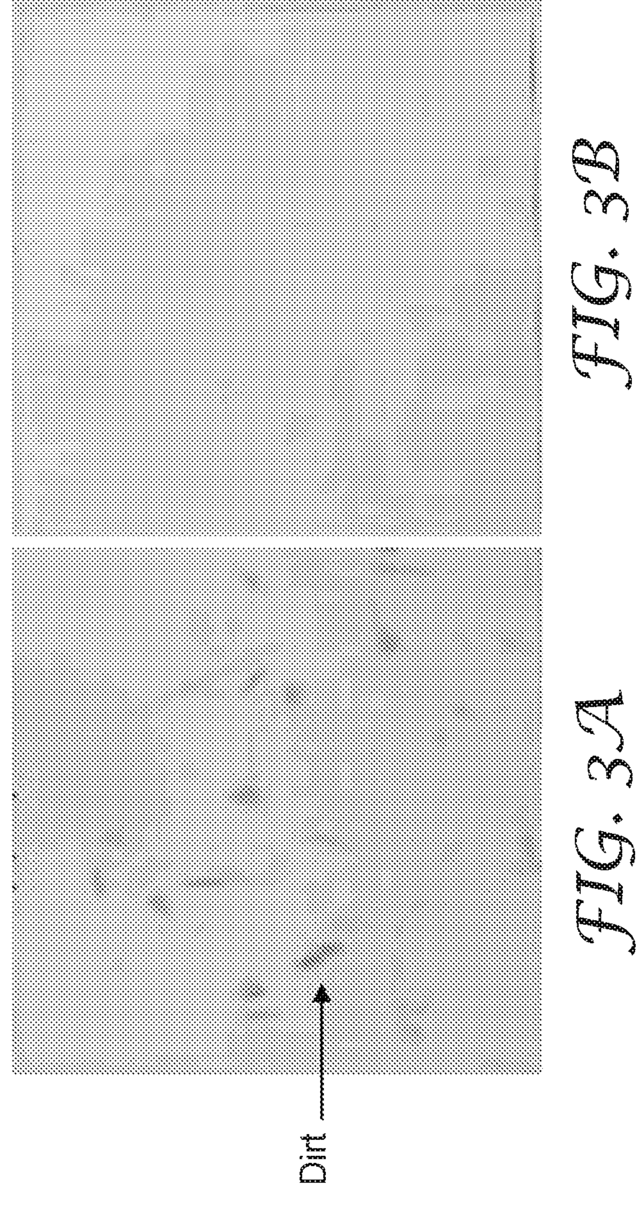
FIG. 3(*a*) is a photograph after a heel mark test of a laminate of Reference Example 1, and FIG. 3(*b*) is a photograph after a heel mark test of a laminate of Example 11.

Hereinafter, representative embodiments of the present invention will be described in more detail with reference to the drawing as required for the purpose of illustration, but the present invention is not limited to these embodiments.

In the present disclosure, “matte properties” are intended to exhibit low surface glossiness compared to a surface layer that does not include resin beads.

In the present disclosure, “scratch resistance” is intended to exhibit good results in both the needle scratch test and the nail scratch test described below.

In the present disclosure, the term “(meth)acrylic” refers to acrylic or methacrylic, and the term “(meth)acrylate” refers to acrylate or methacrylate.

In the present disclosure, “curing” may also include a concept commonly referred to as “crosslink”.

In the present disclosure, the term “film” encompasses articles referred to as “sheets”.

In the present disclosure, the term “on”, for example used in “a surface layer is disposed on the substrate” means that the surface layer is disposed directly on the upper side of the substrate, or that the surface layer is indirectly disposed on the upper side of the substrate via other layers.

In the present disclosure, the term “under”, for example used in “an adhesive layer is disposed under the substrate” means that the adhesive layer is disposed directly under the lower side of the substrate, or that the adhesive layer is indirectly disposed under the lower side of the substrate via other layers.

In the present disclosure, “substantially” means that a variation caused by a manufacturing error or the like is included, and is intended to allow a variation of approximately ±20%.

In the present disclosure, “transparent” refers to an average transmittance in the visible light region (wavelength from 400 nm to 700 nm) measured in accordance with JIS K 7375 of approximately 80% or greater, and the average transmittance may be desirably approximately 85% or greater or approximately 90% or greater. The upper limit of the average transmittance is not particularly limited, and can be, for example, less than approximately 100%, approximately 99% or less, or approximately 98% or less.

In the present disclosure, “translucent” refers to an average transmittance in the visible light region (wavelength from 400 nm to 700 nm) measured in accordance with JIS K 7375 of less than approximately 80%, and the average transmittance may be desirably approximately 75% or less, and is intended not to completely hide an underlying layer.

In an embodiment, a laminate of the present disclosure includes a substrate; and a surface layer having scratch resistance and matte properties that includes resin beads having an average particle size of approximately 1 micrometer or greater and approximately 20 micrometers or less, and having a glass transition temperature of higher than approximately −30° C. and lower than approximately 34° C., and a binder, wherein the surface layer contains the resin beads of less than approximately 75% by mass based on a total weight of the surface layer, and exhibits an elastic modulus of approximately 65 MPa or less in a region other than the resin beads of the surface layer when the elastic modulus of the surface layer is measured using an atomic force microscope. The surface layer may be formed of a single layer or a stacked layer.

It is considered that the failure mode of the surface layer in the needle scratch test is affected by the slippage or fracture of the resin beads by the needle. Since the resin beads of the present disclosure have a glass transition temperature in a predetermined range that contributes to the flexibility of the beads, it is possible to prevent or reduce the slippage or fracture of the resin beads by the needle.

In consideration of further preventing the surface layer from being fractured by the needle in the needle scratch test, generally, it is considered to increase the hardness of the surface layer by blending, for example, a hard binder or hard inorganic particles to the surface layer. However, in such cases, the present inventors have found that, while the needle scratch resistance is improved, nail scratch resistance is reduced because the nail is easily abraded by the hardened surface layer.

In the laminate of the present disclosure, the surface layer contains a predetermined amount of resin beads having an average particle size and a glass transition temperature in the above range, and exhibits a predetermined elastic modulus. Therefore, it is possible to provide a laminate having excellent scratch resistance in both needle scratch resistance and nail scratch resistance in addition to the matte properties.

FIG. 1 is a schematic cross-sectional view of a laminate of an embodiment of the present invention. A laminate 100 of FIG. 1 includes a surface layer 10 and a substrate 20. The surface layer 10 includes a binder 11 and resin beads 12 having an average particle size of approximately 1 micrometer or greater and approximately 20 micrometers or less, and has a glass transition temperature of higher than approximately −30° C. and lower than approximately 34° C.

The binder is not particularly limited as long as the surface layer containing the binder can exhibit the elastic modulus described above, and examples thereof include a resin having a urethane bond, a (meth)acrylic resin, an epoxy resin, a phenolic resin, polyvinyl alcohols, a vinyl acetate resin, a vinyl chloride resin, and a silicone resin. Among these, from the viewpoint of the scratch resistance, a resin having a urethane bond is preferable, and a urethane resin is more preferable. In the present disclosure, the term “resin having a urethane bond” may include, for example, a resin prepared using at least one type selected from urethane (meth)acrylate and urethane (meth)acrylate oligomer, and the urethane resin can also include a (meth)acrylic urethane resin, and the like. The binder can be used alone, or in combination of two or more.

The content of the binder can be, for example, greater than approximately 25% by mass, approximately 26% by mass or greater, approximately 28% by mass or greater, or approximately 30% by mass or greater, based on the total weight of the surface layer. An upper limit of the content of the binder is not particularly limited, but from the viewpoint of the matte properties, scratch resistance, and the like, the upper limit can be set to approximately 90% by mass or less, approximately 80% by mass or less, approximately 70% by mass or less, approximately 60% by mass or less, approximately 50% by mass or less, or approximately less than 50% by mass. A blending amount of the binder can be appropriately selected based on the required performance (for example, the matte properties and scratch resistance) in accordance with the use application from such a range.

In one embodiment, the binder may be a water-based or non-water-based resin prepared using a water-based or non-water-based (solvent-based) composition. However, since the soft surface layer is easy to prepare, it is advantageous to use a resin prepared using a water-based composition (sometimes referred to as a “water-based resin”). Examples of the water-based resin include a water-based resin having a urethane bond (sometimes referred to as “water-based urethane resin”), a water-based (meth)acrylic resin, a water-based vinyl chloride resin, a water-based vinyl acetate resin, and a water-based silicone resin. Among these, from the viewpoint of the scratch resistance, a water-based urethane resin is preferable.

A water-based urethane resin as a binder can be prepared, for example, using a water-based urethane resin composition dispersed in an aqueous dispersion medium in an emulsion such as an emulsion containing oil droplets (urethane resin particles). By applying such a water-based urethane resin composition on a substrate and drying and optionally cross-linking, a layer containing a water-based urethane resin can be formed on the substrate.

The water-based urethane resin can be obtained by, for example, reacting polyol and polyisocyanate with polyamine as necessary. Here, the polyamine is not particularly limited as long as it is a compound having an amino group and/or an imino group, and can function, for example, as a chain extender.

The polyol that can form the water-based urethane resin is not particularly limited as long as the polyol is a compound having a plurality of hydroxyl groups. Examples of suitable polyol include polyether polyol; polyester polyol; polymer polyol with carbon-carbon bonds in a main chain skeleton, such as (meth)acrylic polyol, polybutadiene diol, and hydrogenated polybutadiene polyol; polycarbonate polyol; and polycaprolactone polyester. The polyol can be used alone, or in combination of two or more types thereof.

The polyisocyanate that can form the water-based urethane resin is not particularly limited as long as the polyisocyanate is a compound having a plurality of isocyanate groups. Preferable examples of the polyisocyanate include aromatic polyisocyanate (for example, 2,6-toluene diisocyanate, 2,5-toluene diisocyanate, 2,4-toluene diisocyanate, m-phenylene diisocyanate, p-phenylene diisocyanate, methylenebis (o-chlorophenyl diisocyanate), methylene diphenylene-4,4'-diisocyanate, polycarbodiimide-modified methylene diphenylene diisocyanate, (4,4'-diisocyanato-3,3',5,5'-tetraethyl) diphenylmethane, 4,4'-diisocyanato-3,3'-dimethoxybiphenyl (o-dianicidin diisocyanate), 5-chloro-2, 4-toluene diisocyanate, and 1-chloromethyl-2,4-diisocyanatobenzene); aromatic-aliphatic polyisocyanate (for example, m-xylylene diisocyanate and tetramethyl-m-xylylene diisocyanate); aliphatic polyisocyanate (for example, 1,4-diisocyanatobutane, 1,6-diisocyanatohexane, 1,12-diisocyanatododecane, and 2-methyl-1,5-diisocyanatopentane); alicyclic polyisocyanate (for example, dicyclohexylmethane-4,4'-diisocyanate, 3-isocyanatomethyl-3,5,5-trimethylcyclohexylisocyanate (isophorone diisocyanate), 2,2,4-trimethylhexyl diisocyanate, and cyclohexylene-1,4-diisocyanate); and those obtained by terminally treating polymer compounds or oligomer compounds (for example, polyoxyalkylene polyester, and polybutadienyl) with two isocyanate functional groups (for example, diurethane of polypropylene oxide glycol terminally-treated with toluene-2,4-diisocyanate). In addition, metamorphos such as dimers, trimers or biurets of these polyisocyanates can also be exemplified. In some embodiments, the polyisocyanate is preferably aliphatic diisocyanate from the viewpoint of the scratch resistance and the like. Polyisocyanates can be used alone or in a combination of two or more types thereof.

In some embodiments, the water-based resin may further contain one or more types of functional groups that can increase dispersibility and/or solubility in the water-based solvent, as necessary. Such a functional group is not particularly limited as long as it is a hydrophilic group, and examples thereof include a hydroxyl group, a carboxy group, —$COO^-$, a sulfo group, —$SO_3^-$, quaternary ammonium, and a polyethylene glycol chain. Among these, from the viewpoint of durability, long-term stability, and the like, a carboxy group or —$COO^-$ are preferable, and a carboxy group is more preferable. As a component (compound) for introducing a carboxy group or the like into a water-based resin, for example, polyols having a carboxy group such as dimethylolpropionic acid, 2,2-dimethylolbutyric acid, 2,2-dimethylolvaleric acid, and dihydroxysuccinic acid can be used. Note that by examining the presence of such a functional group with respect to the binder in the surface layer, it is possible to determine whether the binder is a water-based resin.

In some embodiments, the binder can include a cross-linked product crosslinked with a crosslinking composition. For example, the water-based urethane resin is dispersed in an aqueous dispersion medium in the form of an emulsion including oil droplets (urethane resin particles). When a crosslinking agent is blended in such a composition to prepare a crosslinking composition, which is applied onto a substrate and cross-linked, a crosslinked structure (network structure) can be formed between the urethane resin particles. As a result, the durability and long-term stability of the surface layer can be further improved.

The crosslinking agent is not particularly limited, and examples thereof include polyaziridine, polycarbodiimide, epoxy, an oxazoline group-containing polymer, or combinations thereof.

The surface layer of the present disclosure includes resin beads having an average particle size of approximately 1 micrometer or greater and approximately 20 micrometers or less, and has a glass transition temperature of higher than approximately −30° C. and lower than approximately 34° C. The resin beads can form fine convexities and concavities based on beads on the surface layer surface of the laminate, as illustrated in FIG. 1, to form a suitable low gloss (matte) structure.

In some embodiments, from the viewpoint of the matte properties and the scratch resistance, the average particle size of the resin beads is preferably approximately 2 micrometers or greater, approximately 3 micrometers or greater, approximately 4 micrometers or greater, or approximately 5 micrometers or greater, and is preferably approximately 18 micrometers or less, approximately 17 micrometers or less, approximately 16 micrometers or less, approximately 15 micrometers or less, approximately 14 micrometers or less, approximately 13 micrometers or less, approximately 12 micrometers or less, approximately 11 micrometers or less, or approximately 10 micrometers or less. The average particle size of the resin beads is a particle size having cumulative volume of 50% measured by using a laser diffraction particle size distribution measuring device.

In some embodiments, from the viewpoint of the scratch resistance, the glass transition temperature (sometimes abbreviated as "Tg") of the resin beads is approximately −28° C. or higher, approximately −25° C. or higher, approximately −23° C. or higher, approximately −20° C. or higher, and approximately −18° C. or higher, or approximately −15° C. or higher, and preferably approximately 32° C. or lower, approximately 30° C. or lower, approximately 25° C. or lower, approximately 20° C. or lower, approximately 15° C. or lower, approximately 10° C. or lower, approximately 5° C. or lower, or approximately 0° C. or lower. The glass transition temperature of the resin beads is the temperature at the midpoint of the temperature range where the glass transition as measured by differential scanning calorimetry (DSC) occurs.

The resin beads are not particularly limited, and examples thereof include resin beads prepared from a resin having a urethane bond, a styrene resin, a nylon resin, a polyester resin, a melamine resin, a silicone resin, and a (meth)acrylic resin. Such resin beads may be solid or may have voids, and can be used alone or in combination of two or more types thereof. Among these, from the viewpoint of the matte properties and scratch resistance, the followability when the surface layer is stretched, and the like, the resin beads containing a resin having a urethane bond (sometimes referred to as "urethane resin beads") are preferable. The surface of the resin beads may be modified with a known surface modification agent.

As the urethane resin beads, crosslinked urethane resin beads obtained by suspension polymerization, seed polymerization, emulsion polymerization, or the like can be used. Such urethane resin beads have excellent flexibility, toughness, scratch resistance, and the like, and these characteristics can be imparted to the surface layer.

When the resin beads and the binder are the same type of resin components, for example, in a case of resin beads and a binder containing a urethane component or resin beads and a binder containing a (meth)acrylic component, such resin beads have excellent affinity with the binder and, therefore, adhesion with the binder can be improved. As a result, even if the laminate is stretched or deformed, the detachment of the resin beads from the binder can be reduced or suppressed. Here, the "same type of resin components" are not limited to a case where the constituent components of the resin are completely the same, and include a case where one or more common resin components are present in the components constituting the resin. For example, resin beads prepared from urethane acrylate have two types of urethane component and acrylic component, and therefore, such resin beads are the same types of resin components as the urethane resin binder, and are also the same types of resin components as the acrylic resin binder.

In addition to the scattering effect of light based on the convexities and concavities of the surface layer surface, in a case where scattering or refractive effects of light due to the resin beads within the surface layer are expected, the refractive index of the resin beads is preferably different from the refractive index of the binder.

From the viewpoint of the matte properties and scratch resistance, the surface layer of the laminate of the present disclosure contains less than approximately 75% by mass of resin beads based on the total weight of the surface layer. In some embodiments, the content of the resin beads in the surface layer may be approximately 74% by mass or less, approximately 72% by mass or less, or approximately 70% by mass or less, based on the total weight of the surface layer. A lower limit of the content of the resin beads in the surface layer is not particularly limited, but from the viewpoint of the matte properties and the like, the content can be set to approximately 10% by mass or greater, approximately 20% by mass or greater, approximately 30% by mass or greater, approximately 40% by mass or greater, approximately 50% by mass or greater, or approximately greater than 50% by mass. A blending amount of the resin beads can be appropriately selected based on the required performance (for example, the matte properties and scratch resistance) in accordance with the use application from such a range.

Figures 4A, 4B:
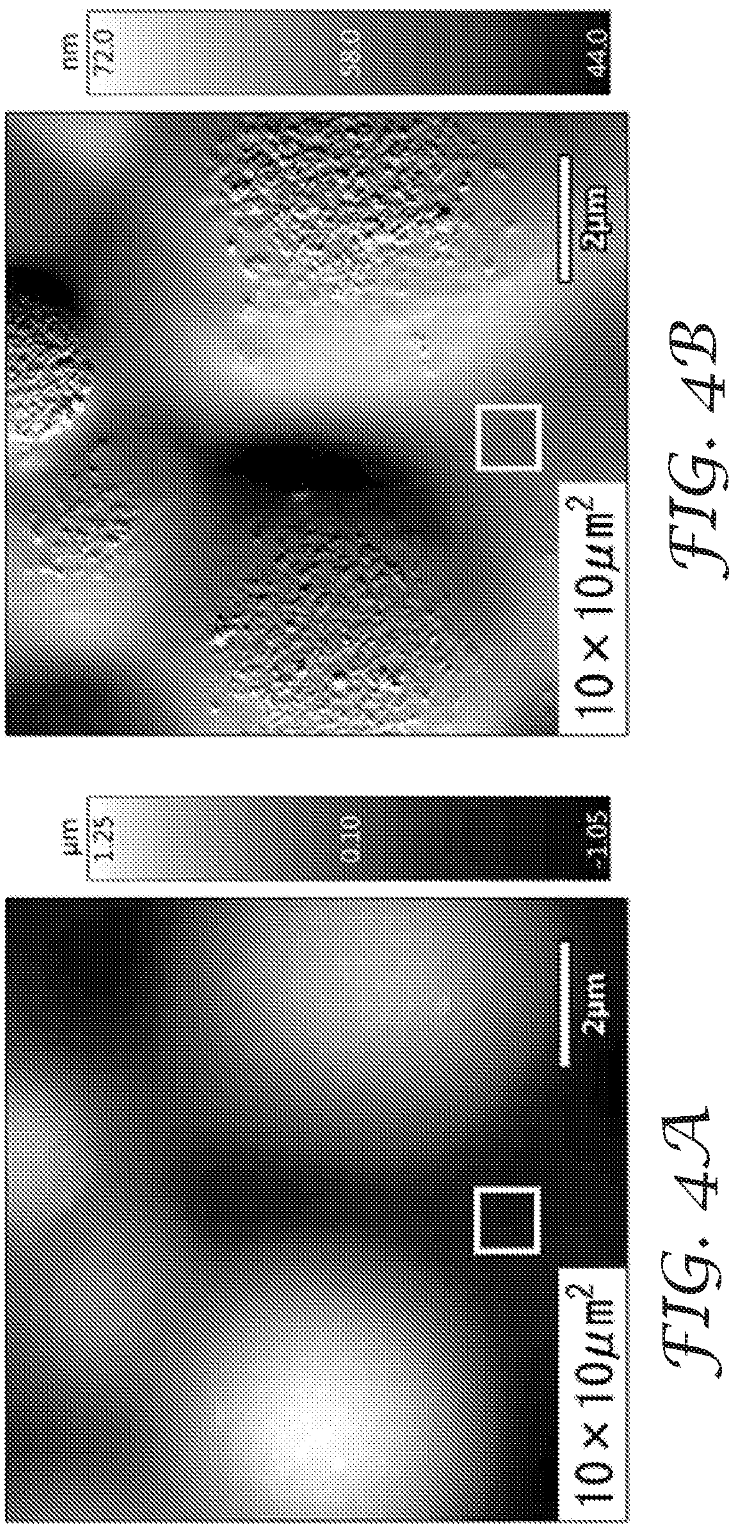
FIG. 4(*a*) is a topographic image of a surface of the laminate of Example 1 using an atomic force microscope, and FIG. 4(*b*) is an amplitude image of the surface of the laminate of Example 1 using the atomic force microscope.

The surface layer of the laminate of the present disclosure contains the resin beads and the binder described above, and exhibits an elastic modulus of approximately 65 MPa or less in regions other than the resin beads of the surface layer when the elastic modulus of the surface layer is measured using an atomic force microscope (sometimes referred to as "AFM"). Measurements by AFM can be performed in a small area on the order of nanometers. Accordingly, for example, in a case where the surface location of the surface layer in the vicinity of a symbol 12 on the right side of FIG. 1 is measured, even if the resin beads are present below the surface layer, the elastic modulus of the regions other than the resin beads of the surface layer can be measured without being affected by the resin beads. AFM measurement is performed by applying a fine needle to the surface. An inclined portion caused by the resin beads may induce a sliding motion of the needle. Therefore, the measurement by AFM in regions other than the resin beads of the surface layer is preferably performed in a substantially flat region (for example, a white-frame rectangular portion of FIG. 4(*b*)) located between the resin beads. The size of a measuring region is not particularly limited. From the viewpoint of obtaining good measurement results, the size of the measuring region is preferably in the range of approximately 0.5× approximately 0.5 square micrometers ($\mu m^2$) to approximately 3×3 square micrometers ($\mu m^2$), and more preferably from approximately 1× approximately 1 square micrometer ($\mu m^2$) to approximately 2× approximately 2 square micrometers ($\mu m^2$). The elastic modulus is the average value of any 5 locations or more of the surface layers, for example, 6 locations at approximately flat locations, measured using AFM based on the conditions described below.

In some embodiments, from the viewpoint of the scratch resistance, the elastic modulus of the surface layer in the region other than the resin beads can be set to approximately 65 MPa or less, approximately 60 MPa or less, approximately 55 MPa or less, approximately 50 MPa or less, approximately 45 MPa or less, approximately 40 MPa or less, approximately 35 MPa or less, or approximately 30 MPa or less. The lower limit of the elastic modulus is not particularly limited, and can be appropriately set on the basis of the required performance (scratch resistance, for example) in accordance with the use application. For example, the lower limit of the elastic modulus can be approximately 1 MPa or greater, approximately 5 MPa or greater, approximately 10 MPa or greater, approximately 15 MPa or greater, approximately 18 MPa or greater, or approximately 20 MPa or greater. When the lower limit of the elastic modulus is approximately 1 MPa or greater, the effect of reducing or preventing the adhesion of dirt, foreign matter, and the like to the surface layer can be expressed.

In some embodiments, the surface layer may include, as other optional components, additives such as an antifoulant, a filler other than resin beads, an ultraviolet absorber, a light stabilizer, a heat stabilizer, a dispersant, a plasticizer, a flow improver, a leveling agent, a pigment, a dye, and fragrance. These additives can be used alone, or in combination of two or more types thereof. Each and the total contents of these additives can be decided in the range that does not impair the characteristics required for the surface layer.

For example, in applications requiring the antifouling performance, it is advantageous to blend an antifoulant in the surface layer. The antifoulant is not particularly limited, and a silicone or fluorine antifoulant can be used, for example. Among these, an antifoulant having at least one or more types of functional groups that can be incorporated into a binder is preferable. Examples of such functional groups include a hydroxyl group, a carboxyl group, an amino group, an epoxy group, and a thiol group. Among these, the antifoulant having a hydroxyl group is less likely to be bled out from the surface layer, for example, by combining it with a water-based isocyanate, it is possible to impart the antifouling performance over a long period of time. Here, "incorporated into a binder" means a state in which it is difficult that an antifoulant that has a functional group be bled out from the surface layer by being miscible, bound, or entangled with the binder component compared to an antifoulant that does not have a functional group.

In some embodiments, an antifoulant containing a resin having a crosslinked structure, for example, an antifoulant containing a silicone resin having a urethane bond is preferable. The silicone resin having a urethane bond can be prepared, for example, by crosslinking a polyether-modified silicone having a hydroxyl group (an antifouling component) and a water-based isocyanate (crosslinking component). The resin having such a crosslinked structure tends to be easily incorporated into the binder and is difficult to be bled out from the surface layer, so it is possible to impart the antifouling performance over a long period of time. In particular, when the binder is a crosslinked product of the water-based urethane resin as described above, the binder component also forms a crosslinked structure between the urethane resin particles and, therefore, it becomes easy to entangle with a resin having a crosslinked structure that is an antifoulant. As a result, since the antifoulant containing a resin having such a crosslinked structure is less likely to be bled out from the surface layer, it is possible to impart the antifouling performance over a longer period of time.

The use of fillers other than resin beads (for example, metal particles and inorganic particles) may deteriorate the results of the nail scratch test. Therefore, the content of such fillers is preferably approximately 10% by mass or less, approximately 5% by mass or less, approximately 3% by mass or less, approximately 1% by mass or less, or approximately 0.5% by mass or less, based on the total weight of the surface layer, or the fillers are more preferably not blended in the surface layer.

The surface coating composition of the present embodiment for preparing a surface layer can include various materials that can be used in the surface layer described above, and contains at least resin beads having an average particle size of approximately 1 micrometer or greater and approximately 20 micrometers or less, and having a glass transition temperature of higher than approximately −30° C. and lower than approximately 34° C., and a binder precursor. Here, the "binder precursor" refers to a component that ultimately becomes a binder in the surface layer, and examples thereof include a curable or crosslinkable monomer and/or a curable or crosslinkable oligomer, a resin that is cured or crosslinked in advance, and a non-curable or non-crosslinkable resin such as a thermoplastic resin. Thus, the surface coating composition can contain additives such as a crosslinking agent and a curing agent, as optional components. A surface coating composition containing a crosslinking agent can be referred to as a crosslinking composition and a surface coating composition containing a curing agent can be referred to as a curable composition.

Furthermore, the surface coating composition of the present embodiment exhibits an elastic modulus of approximately 65 MPa or less in a region other than resin beads of the surface layer, when the elastic modulus of the surface layer formed by the composition is measured using an atomic force microscope. In addition, the surface layer formed by the surface coating composition can similarly exhibit the elastic modulus in the ranges described above.

As described above, it is advantageous that the surface coating composition is a water-based composition because it is easy to prepare a flexible surface layer having an elastic modulus of approximately 65 MPa or less.

The content of resin beads in the surface coating composition can be approximately less than 75 parts by mass, approximately 74 parts by mass or less, approximately 72 parts by mass or less, or approximately 70 parts by mass or less, based on 100 parts by mass of solid content of the surface coating composition. A lower limit of the content of the resin beads is not particularly limited, but from the viewpoint of the matte properties and the like, the content can be set to approximately 10 parts by mass or greater, approximately 20 parts by mass or greater, approximately 30 parts by mass or greater, approximately 40 parts by mass or greater, approximately 50 parts by mass or greater, or approximately greater than 50 parts by mass.

The content of binder precursor in the surface coating composition can be approximately greater than 25 parts by mass, approximately 26 parts by mass or greater, approximately 28 parts by mass or greater, or approximately 30 parts by mass or greater, based on 100 parts by mass of solid content of the surface coating composition. An upper limit of the content of the binder precursor is not particularly limited, but from the viewpoint of the matte properties, scratch resistance, and the like, the upper limit can be set to approximately 90 parts by mass or less, approximately 80 parts by mass or less, approximately 70 parts by mass or less, approximately 60 parts by mass or less, approximately 50 parts by mass or less, or approximately less than 50 parts by mass.

The various additives of the optional components described above can be appropriately blended within a range that does not impair the necessary characteristics of the surface layer obtained by the surface coating composition. Here, when an antifoulant is introduced into the surface layer using a water-based surface coating composition containing polyether-modified silicone having a hydroxyl group serving as an antifoulant, it is advantageous to blend the water-based isocyanate (crosslinking component) compounded in the composition. The hydroxyl group bonded to the polyether-modified silicone tend to adsorb dirt, which may deteriorate the antifouling performance. When a water-based isocyanate is blended in a composition together with polyether-modified silicone having a hydroxyl group, the hydroxyl group is consumed as a result of crosslinking, and thus it is possible to suppress the deterioration of the antifouling performance. At the same time, since the crosslinked structure is easily expressed by the crosslinking reaction of these components and is easily incorporated into the binder of the surface layer, it is possible to suppress bleeding out from the surface layer of the antifoulant to express the antifouling performance for a long period of time.

From the viewpoint of suppressing the deterioration of the antifouling performance, the expression of long-term antifouling performance, scratch resistance, and matte properties, the mass ratio of the water-based isocyanate to the binder precursor can be, in terms of solid content, approximately 30% or greater, approximately 50% or greater, approximately 70% or greater, or approximately 100% or greater, and can be approximately less than 400%, approximately 350% or less, approximately 300% or less, approximately 250% or less, or approximately 200% or less. In addition, a blending amount of the polyether-modified silicone having a hydroxyl group is approximately 0.5 parts by mass or greater, approximately 0.6 parts by mass or greater, approximately 0.7 parts by mass or greater, approximately 0.8 parts by mass or greater, approximately 0.9 parts by mass or greater, or approximately 1.0 parts by mass or greater, and approximately 5.0 parts by mass or less, approximately 4.0 parts by mass or less, approximately 3.0 parts by mass or less, or approximately 2.0 parts by mass or less, based on 100 parts by mass of solid content of the surface coating composition.

As the water-based isocyanate, for example, a water-dispersible isocyanate-based crosslinking agent can be used. Examples of the water-dispersible isocyanate-based crosslinking agent include a compound in the form of self-emulsifying by modifying a polyisocyanate compound having two or more isocyanate groups in one molecule with a hydrophilic group such as polyethylene oxide, a carboxyl group, or a sulfonic acid group (hereinafter, also referred to as "self-emulsifying isocyanate-based crosslinking agent"), or a compound in the form of being emulsified with a surfactant or the like so as to be dispersed in water (hereinafter, also referred to as "forced emulsified isocyanate-based crosslinking agent").

Among the self-emulsifying isocyanate-based crosslinking agent and the forced emulsified isocyanate-based crosslinking agent, blocked isocyanate-based crosslinking agents that are protected by a blocking agent so that the isocyanate groups do not react with an aqueous medium.

Examples of the polyisocyanate compound in the water-dispersible isocyanate-based crosslinking agent include an aromatic polyisocyanate compound represented by xylylene diisocyanate, diphenylmethane diisocyanate, triphenylmethane triisocyanate, and tolylene diisocyanate; a chain or cyclic aliphatic polyisocyanate compound represented by hexamethylene diisocyanate, isophorone diisocyanate, and a hydrogenated product of the aromatic polyisocyanate compound described above; biurets, dimers, trimers, or pentamers of these polyisocyanate compounds; and adduct bodies of these polyisocyanate compounds and polyol compounds such as trimethylolpropane. The water-dispersible isocyanate-based crosslinking agent can be used alone or in a combination of two or more types thereof.

More specifically, examples of the polyisocyanate compound in a water-dispersible isocyanate-based crosslinking agent include 2,4-tolylene diisocyanate, 2,6-tolylene diisocyanate, hydrogenated tolylene diisocyanate, 1,3-xylylene diisocyanate, 1,4-xylylene diisocyanate, hexamethylene diisocyanate, diphenylmethane-4,4-diisocyanate, isophorone diisocyanate, 1,3-bis (isocyanatomethyl) cyclohexane, tetramethylxylylene diisocyanate, 1,5-naphthalene diisocyanate, triphenylmethane triisocyanate, adducts of these polyisocyanate compounds and polyol compounds such as trimethylolpropane, and burette and isocyanurates of these polyisocyanate compounds.

Examples of the blocking agent include known blocking agents such as phenols, alkyl phenols, active methylene compounds, oximes, lactams, bisulfites, and imidazoles. The blocking agent can be used alone, or in combination of two or more types thereof.

Commercially available products may be used as the water-dispersible isocyanate-based crosslinking agent. Among the water-dispersible isocyanate-based crosslinking agents, examples of a commercially available blocked isocyanate crosslinking agent include "DESMODUR (trade name) BL1100", "DESMODUR (trade name) BL1265 MPA/X", "DESMODUR (trade name) VPLS2253", "DESMODUR (trade name) BL3475 BA/SN", "DESMODUR (trade name) BL3272 MPA", "DESMODUR (trade name) BL3370 MPA", "DESMODUR (trade name) BL4265 SN", "Desmosome (trade name) 2170", and "Sumidur (trade name) BL3175", which are available from Covestro AG; "Takenate (trade name) B-830N", "Takenate (trade name) B-815N", "Takenate (trade name) B-820NSU", "Takenate (trade name) B-846N", "Takenate (trade name) B-870N", "Takenate (trade name) B-874N", "Takenate (trade name) B-882N", "Takenate (trade name) B-883NS", "Takenate (trade name) WB-3936", and "Takenate (trade name) WB-3021", which are available from Mitsui Chemicals, Incorporated; and "Aqua BI200" and "Aqua B1220", which are available from Baxenden.

Examples of a commercial product of the water-dispersible isocyanate-based crosslinking agent other than the blocked isocyanate-based crosslinking agent include "Duranate (trade name) WB40-100", "Duranate (trade name) WT20-100", "Duranate (trade name) WT30-100", "Duranate (trade name) WL70-100", "Duranate (trade name) WR80-70P", and "Duranate (trade name) WE50-100", which are available from Asahi Kasei Chemicals Co., Ltd., "Takenate (trade name) WD-720", "Takenate (trade name) WD-723", "Takenate (trade name) WD-725", "Takenate (trade name) WD-726", and "Takenate (trade name) WD-730", which are available from Mitsui Chemicals, Incorporated; "Bernock (trade name) DNW-5000" and "Bernock (trade name) DNW-6000", which are available from DIC Corporation; "Bayhydur (trade name) 3100", "Bayhydur (trade name) VPLS2306", "Bayhydur (trade name) VPLS2319", "Bayhydur (trade name) VPLS2336", "Bayhydur (trade name) VPLS2150/1", "Bayhydur (trade name) VPLS2150RA", "Bayhydur (trade name) BL5140", "Bayhydur (trade name) BL5235", "Bayhydur (trade name) VPLS2240", and "Bayhydur (trade name) VPLS2310", which are available from Covestro AG; "Elastron (trade name) BN-04", "Elastron (trade name) BN-11", "Elastron (trade name) BN-27", "Elastron (trade name) BN-69", and "Elastron (trade name) BN-77", which are available from DKS Co. Ltd.; "Aquanate (trade name) 100", "Aquanate (trade name) 105", "Aquanate (trade name) 110", "Aquanate (trade name) 120", "Aquanate (trade name) 130", "Aquanate (trade name) 200", and "Aquanate (trade name) 210", which are available from Tosoh Corporation.

In order to improve workability, coating properties, and the like, the surface coating composition can optionally blend an organic solvent, an aqueous dispersion medium, and the like. Among them, the use of an aqueous dispersion medium is advantageous from the viewpoint of safety to the human body and obtaining a water-based composition in which a flexible surface layer can be easily prepared. As the aqueous dispersion medium, for example, distilled water, purified water, ion-exchanged water, and tap water can be used. In a range that does not affect the effect of the present invention, water soluble alcohols such as ethanol or the like may be used in combination with such water. The water-based composition may include an organic solvent such as toluene in a range of approximately 1000 ppm or less, but from the viewpoint of safety to the human body or the like, such an organic solvent is preferably not included.

The method of forming a surface layer using the surface coating composition is not particularly limited, and a known method can be employed. The surface layer can be formed by coating the substrate with the surface coating composition using knife coating, bar coating, blade coating, doctor coating, roll coating, cast coating, and the like and, as necessary, drying and optionally thermosetting or ionizing radiation curing.

The thickness of the surface layer can be approximately 1 micrometer or greater, approximately 3 micrometers or greater, approximately 4 micrometers or greater, approximately 5 micrometers or greater, approximately 6 micrometers or greater, approximately 8 micrometers or greater, or approximately 10 micrometers or greater, and can be approximately 50 micrometers or less, approximately 30 micrometers or less, approximately 20 micrometers or less, or approximately 15 micrometers or less. The thickness of the surface layer can be appropriately selected based on the required performance (for example, scratch resistance) in accordance with the use application from such a range. Here, in the present disclosure, the thickness of the surface layer refers to the thickness of the thickest portion, i.e. the maximum thickness. The maximum thickness is an average value of a value measured at 5 locations or more, and preferably 10 locations, using a micrometer (model number: ID-C112XB) available from Mitutoyo Corporation, in accordance with JIS K6783.

The substrate constituting the laminate of the present disclosure is not particularly limited, and for example, an organic substrate containing at least one selected from the group consisting of a polyvinyl chloride resin, a polyurethane resin, a polyolefin resin, a polyester resin, a vinyl chloride-vinyl acetate resin, a polycarbonate resin, a (meth) acrylic resin, a cellulose resin, and a fluororesin can be used. As the substrate, an inorganic substrate such as glass, or a metal substrate such as aluminum can also be used.

The shape or configuration of the substrate is not particularly limited: it can be, for example, film shape, plate shape, curved surface shape, deformed shape, or three-dimensional shape, and it can also be single-layer configuration, laminated configuration, or composite configuration such as in which plural substrates in different shapes are combined.

The substrate may be colored or colorless. The substrate may be opaque, translucent or transparent. The substrate may include a substantially smooth surface and may include a structured surface that can be formed by surface processing such as embossing.

In an embodiment, the substrate may include a transparent resin layer and a colored resin layer, for example, a transparent polyvinyl chloride resin layer and a colored polyvinyl chloride resin layer. In the laminate of this embodiment, the colored resin layer is supported or protected by the transparent resin layer, and thus durability can be imparted to the decorative characteristics of the laminate. For example, the laminate of this embodiment can be used suitably for attaching to an interior material or an exterior material of a structure or a vehicle.

The thickness of the substrate can be approximately 25 micrometer or grater, approximately 50 micrometer or grater, or approximately 80 micrometer or grater, and can be approximately 5 mm or less, approximately 1 mm or less, and approximately 0.5 mm or less.

In some embodiments, a stretchable substrate layer can be used as the substrate. The tensile elongation ratio of the stretchable substrate can be approximately 10% or greater, approximately 20% or greater, or approximately 30% or greater, and can be approximately 400% or less, approximately 350% or less, or approximately 300% or less. The tensile elongation ratio of the stretchable substrate is a value calculated by preparing a sample having a width of 25 mm and a length of 150 mm and stretching the sample until the sample is broken using a tensile tester at a temperature of 20° C., a tensile test speed of 300 mm/min, and a grip spacing of 100 mm, using the equation: [grip spacing at the time of breaking (mm)−grip spacing before the stretching (mm) (=100 mm)]/grip spacing before the stretching (mm) (=100 mm)×100(%).

In some embodiments, in the laminate of this embodiment, additional layers such as a colored layer, a decorative layer, a bright layer, a bonding layer (primer layer), and an adhesive layer may be applied between the surface layer and the substrate, or on the substrate surface on the side opposite to the surface layer. These additional layers can be used alone or in combination of two or more types thereof, and can be applied to the entire surface or a part of the laminate.

A generally used adhesive such as a solvent-type, emulsion-type, pressure-sensitive type, heat-sensitive type, or heat-curable or radiation-curable type (for example, ultraviolet-curable type) adhesive, including acrylics, polyolefins, polyurethanes, polyesters, rubbers, and the like can be used as the adhesive layer. The thickness of the adhesive layer is not limited to the following and, for example, 5 micrometers or greater, approximately 10 micrometers or greater, or approximately 20 micrometers or greater, and can be approximately 100 micrometers or less, approximately 80 micrometers or less, or approximately 50 micrometers or less.

A release liner may be imparted to a surface of the adhesive layer. Examples of the release liner include paper; a plastic material such as polyethylene, polypropylene, polyester, and cellulose acetate; and paper coated with such a plastic material. These liners may have a surface subjected to peeling treatment with silicone or the like. The thickness of the release liner, generally, can be approximately 5 micrometers or greater, approximately 15 micrometers or greater, or approximately 25 micrometers or greater, and can be approximately 500 micrometers or less, approximately 300 micrometers or less, or approximately 250 micrometers or less.

The laminate of the present embodiments may be, for example, a sheet-like article, a rolled body winded in a roll shape or an article with a three-dimensional shape.

The surface layer of the laminate of the present disclosure has the matte properties. The matte properties can be evaluated, for example, with 60-degree surface glossiness, that is, a surface glossiness at 60 degrees. In some embodiments, the surface layer of the laminate of the present disclosure can exhibit the 60-degree surface glossiness of approximately 5.0 GU or lower, approximately 4.0 GU or lower, approximately 3.0 GU or lower, approximately 2.0 GU or lower, or approximately 1.0 GU or lower. The lower limit of the 60-degree surface glossiness is not particularly limited and, for example, can be approximately 0.1 GU or greater, approximately 0.2 GU or greater, approximately 0.3 GU or greater, or approximately 0.4 GU or greater. The surface glossiness is a value measured using a portable glossmeter GMX-203 (Murakami Color Research Laboratory Co., Ltd., Chuo-ku, Tokyo, Japan).

The surface layer of the laminate of the present disclosure has the scratch resistance and can provide good results for both needle scratch test and nail scratch test.

The needle scratch test is performed under the following conditions using a Clemens-type scratch hardness tester in accordance with JIS K5600-5-4. When the surface layer of the laminate is scratched and it is observed from the front whether or not there is damage on the surface that causes cohesive failure other than the initial region (1 mm), the laminate of the present disclosure can exhibit the maximum load capacity, for which the damage cannot be confirmed, of 50 g or greater, 60 g or greater, or 70 g or greater:

(Test Conditions)

For a test piece, a sample is attached to an aluminum plate having a thickness of 0.7 mm, and horizontally fixed to a test table.

Use load: 10 g to 200 g (10 g units)

Needle: Steel needle

Needle tip R: 5/100 mm

Needle tip angle: 90°

Scratch angle: 90° to test piece

Movement speed: 10 mm/4 seconds

Movement distance: 10 mm

The nail scratch test is performed by placing a test sample on an aluminum plate with the surface layer side up, setting a nail of an index finger on the test sample at an angle of approximately 90°, and moving the nail at a speed of approximately 300 mm/sec to scratch the surface layer. In the laminate of the present disclosure, no scratches are observed in the surface layers in such tests.

In some embodiments, the laminate of the present disclosure may have antifouling properties. The antifouling properties can be evaluated by a heel mark resistance test according to JIS K3920. Such a test may be performed by attaching a test sample on each surface of a hexagonal test drum with the surface layer side up, placing a black rubber in the drum, and rotating the drum under the conditions equivalent to 10000 people. In the laminate of the present disclosure of one embodiment, when water is applied to the surface layer of the laminate after the test and wiped with a Kimwipe, no dirt is observed on the surface layer.

Application of the laminate of the present disclosure is not particularly limited. For example, the laminate of the present disclosure can be used in decorative applications, optical applications, and the like. For example, the laminate of the present disclosure can be used as interior materials for walls, stairs, ceilings, pillars, and partitions, or exterior materials for outer walls, and the like of buildings, condominiums, houses, and the like; can be used as interior or exterior materials for various vehicles such as railroad vehicles, ships, airplanes, automobiles including two-wheeled and four-wheeled vehicles; and can also be used as a surface material for all kinds of articles such as road signs, signboards, furniture, and electrical appliances. Furthermore, the laminate of the present disclosure can also be used as a light diffusing member used in a display device such as a liquid crystal display and an organic EL display device, for example, a light diffusion film or light diffusion plate for ensuring uniformity of brightness of a backlight, or an anti-glare (Ag) film for reducing or preventing the projection of light or the like of a fluorescent lamp.

EXAMPLES

In the following examples, specific embodiments of the present disclosure will be exemplified, but the present invention is not limited to those embodiments. All parts and percent are based on mass unless otherwise specified. A numerical value essentially includes an error derived from a measurement principle and a measuring device. The numerical value is generally indicated by a significant digit that is normally rounded.

Materials and reagents used in the present examples and comparative examples are indicated in Table 1.

TABLE 1

| Trade name, model number or abbreviated name | Description | Manufacturer |
|---|---|---|
| Art Pearl (trade name) C-800T | Urethane resin beads, average particle size of 6 micrometers, Tg −13° C. | Negami Chemical Industrial Co., Ltd. (Nomi-shi, Ishikawa, Japan) |
| Art Pearl (trade name) CE-800T | Urethane resin beads, average particle size of 6 micrometers, Tg −34° C. | Negami Chemical Industrial Co., Ltd. (Nomi-shi, Ishikawa, Japan) |

TABLE 1-continued

| Trade name, model number or abbreviated name | Description | Manufacturer |
|---|---|---|
| Art Pearl (trade name) P-800T | Urethane resin beads, average particle size of 6 micrometers, Tg −34° C. | Negami Chemical Industrial Co., Ltd. (Nomi-shi, Ishikawa, Japan) |
| Art Pearl (trade name) TK-800T | Urethane resin beads, average particle size of 6 micrometers, Tg −30° C. | Negami Chemical Industrial Co., Ltd. (Nomi-shi, Ishikawa, Japan) |
| Art Pearl (trade name) C-1000T | Urethane resin beads, average particle size of 3 micrometers, Tg −13° C. | Negami Chemical Industrial Co., Ltd. (Nomi-shi, Ishikawa, Japan) |
| Art Pearl (trade name) C-600T | Urethane resin beads, average particle size of 10 micrometers, Tg −13° C. | Negami Chemical Industrial Co., Ltd. (Nomi-shi, Ishikawa, Japan) |
| Art Pearl (trade name) C-400T | Urethane resin beads, average particle size of 15 micrometers, Tg −13° C. | Negami Chemical Industrial Co., Ltd. (Nomi-shi, Ishikawa, Japan) |
| Art Pearl (trade name) C-300T | Urethane resin beads, average particle size of 22 micrometers, Tg −13° C. | Negami Chemical Industrial Co., Ltd. (Nomi-shi, Ishikawa, Japan) |
| Art Pearl (trade name) C-200T | Urethane resin beads, average particle size of 32 micrometers, Tg −13° C. | Negami Chemical Industrial Co., Ltd. (Nomi-shi, Ishikawa, Japan) |
| Grand Pearl (trade name) GU-0700P | Urethane resin beads, average particle size of 7 micrometers, Tg −25° C. | Aica Kogyo Company, Limited (Nagoya-shi, Aichi Prefecture, Japan) |
| ETERNAL COLL (trade name) UW-1005E | Water-based urethane resin (polyurethane dispersion), elastic modulus of 20 MPa, solid content of 30% | Ube Industries, Ltd. (Minato-ku, Tokyo, Japan) |
| ETERNAL COLL (trade name) UW-3039E | Water-based urethane resin (polyurethane dispersion), elastic modulus of 540 MPa, solid content of 30% | Ube Industries, Ltd. (Minato-ku, Tokyo, Japan) |
| ETERNAL COLL (trade name) UW-50002E | Water-based urethane resin (polyurethane dispersion), elastic modulus of 640 MPa, solid content of 30% | Ube Industries, Ltd. (Minato-ku, Tokyo, Japan) |
| ETERNAL COLL (trade name) ST-0530 | Water-based urethane resin (polyurethane dispersion), elastic modulus of 140 MPa, solid content of 30% | Ube Industries, Ltd. (Minato-ku, Tokyo, Japan) |
| Dynol (trade name) 604 | Acetylene glycol | Nissin Chemical Co., Ltd. (Echizen City, Fukui Prefecture, Japan) |
| Carbodilite V-02 | Polycarbodiimide resin (water-based crosslinkability) | Nisshinbo Chemical Inc. (Chuo-ku, Tokyo, Japan) |
| 2-PA | 2-propanol | FUJIFILM Wako Pure Chemical Corporation (Chuo-ku, Osaka, Japan) |
| Water | Ion-exchanged water | FUJIFILM Wako Pure Chemical Corporation (Chuo-ku, Osaka, Japan) |
| MIBK ST L | $SiO_2$ nanoparticles dispersed in methyl isobutyl ketone (solid content of 30% by mass) | Nissan Chemical Industries, Ltd. (Chiyoda-ku, Tokyo, Japan) |
| T5652 | Polycarbonate diol | Asahi Kasei Corporation (Chiyoda-ku, Tokyo, Japan) |
| CAB-381-20 | Cellulose acetate butyrate | Eastman Chemical Company (Kingsport, Tennessee, US) |

TABLE 1-continued

| Trade name, model number or abbreviated name | Description | Manufacturer |
|---|---|---|
| BYK (trade name) - SILCLEAN 3700 | Silicone modified polyacrylate having a hydroxyl group | BYK Japan KK (Shinjuku-ku, Tokyo, Japan) |
| BYK (trademakr) - SILCLEAN 3720 | Polyether-modified polydimethylsiloxane having a hydroxyl group | BYK Japan KK (Shinjuku-ku, Tokyo, Japan) |
| D11ON | Xylylene diisocyanate | Mitsui Chemicals, Inc. (Minato-ku, Tokyo, Japan) |
| Takenate (trade name) WB-3936 | Aqueous blocked isocyanate (XDI) | Mitsui Chemicals, Inc. (Minato-ku, Tokyo, Japan) |
| MPA | 1-Methoxy-2-propyl acetate | Sigma-Aldrich Co. LLC (Saint Louis, Missouri, United States) |
| Tinuvin 292 | Light stabilizer | BASF Japan Ltd. (Chuo-ku, Tokyo, Japan) |
| Tinuvin 1130 | UV absorbent | BASF Japan Ltd. (Chuo-ku, Tokyo, Japan) |
| ACRYSOL (trade name) RM-8W | Non-ionic urethane rheology modifier | Dow Chemical Japan Limited (Shinagawa-ku, Tokyo, Japan) |

Example 1

A polyvinyl chloride film and a polyethylene terephthalate (PET) film were heat-laminated to obtain a transparent polyvinyl chloride film substrate. Here, the composition of the polyvinyl chloride film was polyvinyl chloride/ester plasticizer/organic stabilizer (acrylic resin, zinc stearate, and the like)=72/16/12 (mass ratio). The PET film was Teijin (trade name) Tetoron (trade name) Film G2 (available from Teijin Film Solutions Limited, Chiyoda-ku, Tokyo, Japan) having a thickness of 50 μm.

A surface coating composition was obtained by putting and mixing the respective materials indicated in Table 2 for 2.0 minutes using a Planetary Centrifugal Mixer THINKY AR-250 (available from Thinky Corporation, Chiyoda-ku, Tokyo, Japan). The surface coating composition was coated with a knife coater onto a transparent polyvinyl chloride film substrate. Drying and thermal curing in an oven at a temperature of 65° C. for 2 minutes in an oven at a temperature of 150° C. for 5 minutes to form a surface layer with a dry thickness of approximately 12 micrometers. After the PET film was peeled from the transparent polyvinyl chloride film substrate, the transparent polyvinyl chloride film substrate having a surface layer and the black vinyl chloride film with embossing of the satin surface were heated and laminated to obtain a decorative film in a laminated configuration. The composition of the black vinyl chloride film was polyvinyl chloride/ester plasticizer/organic stabilizer, and pigment, and the like (acrylic resin, zinc stearate, carbon black, and the like)=72/16/12 (mass ratio).

Example 2

A decorative film was produced in the same manner as in Example 1 except that the binder was changed to ETERNAL COLL (trade name) ST-053D.

Example 3 to 7

A decorative film was produced in the same manner as in Example 1 except that the content of the resin beads was changed to 30% by mass, 40% by mass, 50% by mass, 60% by mass, and 65% by mass based on the total weight (solid content) of the surface layer.

Example 8 to 10

A decorative film was produced in the same manner as in Example 1 except that the average particle size of the resin beads was changed to 3 micrometers, 10 micrometers, and 15 micrometers.

Example 11

A decorative film was produced in the same manner as in Example 1 except that the glass transition temperature of the resin beads was changed to −25° C.

Comparative Examples 1 and 2

A decorative film was produced in the same manner as in Example 1 except that the binder was changed to ETERNAL COLL (trade name) UW-3039E and ETERNAL COLL (trade name) UW-5002E.

Comparative Examples 3 and 4

A decorative film was produced in the same manner as in Example 1 except that the content of the resin beads was changed to 75% by mass and 80% by mass based on the total weight (solid content) of the surface layer.

Comparative Examples 5 to 7

A decorative film was produced in the same manner as in Example 1 except that the glass transition temperature of the resin beads was changed to 34° C., −34° C., and −30° C.

Comparative Examples 8 and 9

A decorative film was produced in the same manner as in Example 1 except that the average particle size of the resin beads was changed to 22 micrometers and 32 micrometers.

Comparative Example 10

A decorative film was produced in the same manner as in Example 1 except that the materials were changed to the materials indicated in Table 4.

The following evaluations were carried out for each sample of Examples 1 to 11 and Comparative Examples 1 to 10, and the results are indicated in Tables 2 to 4.

(Elastic Modulus of Surface Layer)

Using an atomic force microscope (Cypher AFM, Oxford Instruments, Inc.), the surface morphology of the surface layer of each test sample was observed in a region of 10×10 square micrometers ($\mu m^2$) at room temperature. Next, a force curve measurement was performed at 2×2 square micrometers or 1×1 square micrometers in a substantially flat region located between the resin beads in the region, and the elastic modulus of the surface layer was measured. The elastic modulus indicated in each table is the average value of the measurements at any 6 locations. Measurement conditions are as follows:

(Measurement Conditions)

(A) Probe

OMCL-AC240TS (Spring constant (k)=2 N/m, tip radius: 7 nm, frequency: 58 to 65 kHz, Olympus Corporation), Calibration of spring constant: Thermal noise method (B) Image Target Amplitude: 2 V Set point: 1.6 V Integral gain: 78

Drive amplitude: 100 to 300 mV (C) Force Curve

Force distance: 1 micrometer

Trigger Point: 1 V

Chip Speed: 1.98 micrometers/sec (Needle Scratch Test)

Each test sample was attached to a 0.7 mm thick aluminum plate to prepare a test piece. The test piece was set in a Clemens-type scratch hardness tester in accordance with JIS K5600-5-4, and tests were performed under the following conditions. The surface of the test sample after the test was visually observed, and cases where scratches occurred at a load of 50 g or more were evaluated as "good", and cases in which scratches occurred at a load of less than 50 g were evaluated as "poor". Note that the "good" results in each table also indicated the maximum load when the scratches were not made. In addition, scratches were confirmed in all the evaluation samples that resulted in "poor" at a working load of 40 g or less:

(Test Conditions)

Used load: 10 g to 200 g (10 g units)

Needle: Steel needle

Needle tip R: 5/100 mm

Needle tip angle: 90°

Scratch angle: 90° to test piece

Movement speed: 10 mm/4 seconds

Movement distance: 10 mm (Nail Scratch Test)

The test is performed by placing each test sample on an aluminum plate with the surface layer side up, setting a nail of an index finger on the test sample at an angle of approximately 90°, and moving the nail at a speed of approximately 300 mm/sec to scratch the surface layer. The surface of the test sample after the test was visually observed, and the cases where the appearance change such as scratches did not occur were evaluated as "good", and the cases where the appearance change occurred were evaluated as "poor".

(60-Degree Surface Glossiness)

The surface glossiness of each test sample was measured at a measurement angle of 60° using a portable glossmeter GMX-203 (Murakami Color Research Laboratory Co., Ltd., Chuo-ku, Tokyo, Japan).

TABLE 2

| | Tg | Average particle size (μm) | Ex 1 | Ex 2 | Ex 3 | Ex 4 | Ex 5 | Ex 6 | Ex 7 | Ex 8 | Ex 9 | Ex 10 | Ex 11 |
|---|---|---|---|---|---|---|---|---|---|---|---|---|---|
| ETERNAL COLL (trade name) UW-1005E | — | — | 29.40 | — | 68.22 | 58.11 | 48.40 | 38.70 | 33.82 | 29.40 | 29.40 | 29.40 | 29.40 |
| ETERNAL COLL (trade name) ST-0530 | — | — | — | 29.36 | — | — | — | — | — | — | — | — | — |
| ETERNAL COLL (trade name) UW-3039E | — | — | — | — | — | — | — | — | — | — | — | — | — |
| ETERNAL COLL (trade name) UW-5002E | — | — | — | — | — | — | — | — | — | — | — | — | — |
| Art Pearl (trade name) C-800T | −13 | 6 | 21.18 | 21.15 | 9.25 | 12.24 | 15.28 | 18.33 | 19.49 | — | — | — | — |
| Art Pearl (trade name) CE-800T | 34 | 6 | — | — | — | — | — | — | — | — | — | — | — |
| Art Pearl (trade name) P-800T | −34 | 6 | — | — | — | — | — | — | — | — | — | — | — |
| Art Pearl (trade name) TK-800T | −30 | 6 | — | — | — | — | — | — | — | — | — | — | — |
| Art Pearl (trade name) C-1000T | −13 | 3 | — | — | — | — | — | — | — | 21.18 | — | — | — |
| Art Pearl (trade name) C-600T | −13 | 10 | — | — | — | — | — | — | — | — | 21.18 | — | — |
| Art Pearl (trade name) C-400T | −13 | 15 | — | — | — | — | — | — | — | — | — | 21.18 | — |
| Art Pearl (trade name) C-300T | −13 | 22 | — | — | — | — | — | — | — | — | — | — | — |
| Art Pearl (trade name) C-200T | −13 | 32 | — | — | — | — | — | — | — | — | — | — | — |
| Grand Pearl (trade name) GU-0700P | −25 | 7 | — | — | — | — | — | — | — | — | — | — | 21.18 |
| Dynal (trade name) 604 | — | — | 0.18 | 0.18 | 0.41 | 0.25 | 0.29 | 0.23 | 0.20 | 0.18 | 0.18 | 0.18 | 0.18 |
| Carbodilite V-02 | — | — | 0.71 | 0.84 | 1.64 | 1.40 | 1.16 | 0.93 | 0.81 | 0.71 | 0.71 | 0.71 | 0.71 |
| 2-PA | — | — | 38.83 | 38.78 | 16.38 | 22.32 | 27.89 | 33.45 | 36.54 | 38.83 | 38.83 | 38.83 | 38.83 |
| Water | — | — | 9.71 | 9.69 | 4.10 | 5.58 | 6.97 | 8.36 | 9.14 | 9.71 | 9.71 | 9.71 | 9.71 |

TABLE 2-continued

| | Tg | Average particle size (μm) | Ex 1 | Ex 2 | Ex 3 | Ex 4 | Ex 5 | Ex 6 | Ex 7 | Ex 8 | Ex 9 | Ex 10 | Ex 11 |
|---|---|---|---|---|---|---|---|---|---|---|---|---|---|
| Content of resin beads with respect to 100 parts by mass of solid content (parts by mass) | | | 70 | 69 | 30 | 40 | 50 | 60 | 65 | 70 | 70 | 70 | 70 |
| Elastic modulus of surface layer (MPa) | | | 25 | 31 | 25 | 25 | 25 | 25 | 25 | 25 | 25 | 25 | 25 |
| Needle scratch test | | | Good (100 g) | Good (70 g) | Good (60 g) | Good (60 g) | Good (60 g) | Good (60 g) | Good (110 g) | Good (70 g) | Good (70 g) | Good (50 g) | Good (70 g) |
| Nail scratch test | | | Good | Good | Good | Good | Good | Good | Good | Good | Good | Good | Good |
| 60-degree surface glossiness | | | 0.6 | 0.8 | 3.9 | 3.3 | 1.5 | 0.9 | 0.7 | 0.5 | 0.6 | 0.6 | 0.6 |

TABLE 3

| | Tg | Average particle size (μm) | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| ETERNAL COLL (trade name) UW-1005E | — | — | — | — | 24.57 | 19.33 | 29.40 | 29.40 | 29.40 | 29.40 | 29.40 |
| ETERNAL COLL (trade name) ST-0530 | — | — | — | — | — | — | — | — | — | — | — |
| ETERNAL COLL (trade name) UW-3039E | — | — | 29.40 | — | — | — | — | — | — | — | — |
| ETERNAL COLL (trade name) UW-5002E | — | — | — | 29.36 | — | — | — | — | — | — | — |
| Art Pearl (trade name) C-800T | −13 | 6 | 21.18 | 21.15 | 22.71 | 24.41 | — | — | — | — | — |
| Art Pearl (trade name) CE-800T | 34 | 6 | — | — | — | — | 21.18 | — | — | — | — |
| Art Pearl (trade name) P-800T | −34 | 6 | — | — | — | — | — | 21.18 | — | — | — |
| Art Pearl (trade name) TK-800T | −30 | 6 | — | — | — | — | — | — | 21.18 | — | — |
| Art Pearl (trade name) C-1000T | −13 | 3 | — | — | — | — | — | — | — | — | — |
| Art Pearl (trade name) C-600T | −13 | 10 | — | — | — | — | — | — | — | — | — |
| Art Pearl (trade name) C-400T | −13 | 15 | — | — | — | — | — | — | — | — | — |
| Art Pearl (trade name) C-300T | −13 | 22 | — | — | — | — | — | — | — | 21.18 | — |
| Art Pearl (trade name) C-200T | −13 | 32 | — | — | — | — | — | — | — | — | 21.18 |
| Grand Pearl (trade name) GU-0700P | −25 | 7 | — | — | — | — | — | — | — | — | — |
| Dynal (trade name) 604 | — | — | 0.18 | 0.18 | 0.15 | 0.12 | 0.18 | 0.18 | 0.18 | 0.18 | 0.18 |
| Carbodilite V-02 | — | — | 0.71 | 0.84 | 0.59 | 0.46 | 0.71 | 0.71 | 0.71 | 0.71 | 0.71 |
| 2-PA | — | — | 38.83 | 38.78 | 41.59 | 44.55 | 38.83 | 38.83 | 38.83 | 38.83 | 38.83 |
| Water | — | — | 9.71 | 9.69 | 10.40 | 11.14 | 9.71 | 9.71 | 9.71 | 9.71 | 9.71 |
| Content of resin beads with respect to 100 parts by mass of solid content (parts by mass) | | | 70 | 69 | 75 | 80 | 70 | 70 | 70 | 70 | 70 |
| Elastic modulus of surface layer (MPa) | | | 132 | 191 | 25 | 25 | 25 | 25 | 25 | 25 | 25 |
| Needle scratch test | | | Good (70 g) | Good (50 g) | Poor | Poor | Good (60 g) | Poor | Poor | Poor | Poor |
| Nail scratch test | | | Poor | Poor | Good | Good | Poor | Good | Good | Good | Good |
| 60-degree surface glossiness | | | 0.8 | 0.9 | 0.4 | 1.2 | 0.5 | 0.6 | 0.6 | 1.9 | 3.2 |

TABLE 4

| | Tg | Average particle size (μm) | Comparative Example 10 |
|---|---|---|---|
| T5652 | — | — | 7.47 |
| D110N | — | — | 2.24 |
| BYK (trade name)-SILCLEAN 3700 | — | — | 1.07 |
| MIBK ST L | — | 0.04 to 0.05 | 13.35 |
| Art Pearl (trade name) CE-800T | 34 | 6 | 13.35 |
| CAB-381-20 | — | — | 1.87 |
| MPA | — | — | 60.65 |
| Content of resin beads with respect to 100 parts by mass of solid content (parts by mass) | | | 47 |
| Elastic modulus of surface layer (MPa) | | | 24.6 |
| Needle scratch test | | | Poor |
| Nail scratch test | | | Poor |
| 60-degree surface glossiness | | | 0.3 |

Example 12

A decorative film was produced in the same manner as in Example 1 except that the composition of the surface coating composition of Example 1 was changed to the composition indicated in Table 5. Here, the surface coating composition of Example 11 further contains Takenate (trade name) WB-3936 (water-based blocked isocyanate), BYK (trade name)-SILCLEAN 3720 (polyether-modified polydimethylsiloxane having a hydroxyl group), Tinuvin 292 (light stabilizer), Tinuvin 1130 (ultraviolet absorber), ACRYSOL (trade name) RM-8W (nonionic urethane rheology modifier) to the surface coating composition of Example 1.

Examples 13 to 18

A decorative film was produced in the same manner as in Example 1 except that the composition was changed such that the mass ratio of Takenate (trade name) WB-3936 to the binder precursor (ETERNA COLL (trade name) UW-1005E) was 30%, 40%, 60%, 90%, 150%, and 200% in terms of solid content, and the blending amount of BYK (trade name)-SILCLEAN 3720 was 1.2 parts by mass, 1.3 parts by mass, 1.5 parts by mass, 1.6 parts by mass, and 1.7 parts by mass, based on 100 parts by mass of solid content of the surface coating composition.

Examples 19 and 20

A decorative film was produced in the same manner as in Example 1 except that the composition was changed such that the blending amount of BYK (trade name)-SILCLEAN 3720 was 0.5 parts by mass and 1.0 parts by mass, based on 100 parts by mass of solid content of the surface coating composition.

Reference Comparative Example 1

A decorative film was produced in the same manner as in Example 1 except that Takenate (trade name) WB-3936 (water-based blocked isocyanate) was not used and the composition were changed to these indicated in Table 6. Here, in the present disclosure, the term "Reference Comparative Example" corresponds to an Example from the viewpoint of matte properties and scratch resistance, but is an example corresponding to a Comparative Example from the viewpoint of antifouling properties that are additional effects.

Reference Comparative Example 2

A decorative film was produced in the same manner as in Example 1 except that BYK (trade name)-SILCLEAN 3720 (polyether modified polydimethylsiloxane having a hydroxyl group) was not used and the composition were changed to these indicated in Table 6.

Reference Comparative Example 3

The decorative film of Example 1 not using Takenate (trade name) WB-3936 and BYK (trade name)-SILCLEAN 3720 was employed as a decorative film of Reference Comparative Example 3.

Comparative Example 11

A decorative film was produced in the same manner as in Example 1 except that the composition was changed such that the mass ratio of Takenate (trade name) WB-3936 to the binder precursor (ETERNA COLL (trade name) UW-1005E) was 400% in terms of solid content, and the blending amount of BYK (trade name)-SILCLEAN 3720 was 0.9 parts by mass, based on 100 parts by mass of solid content of the surface coating composition.

The above evaluation test was performed for each sample of Examples 12 to 20, Reference Comparative Examples 1 to 3, and Comparative Example 11, and the following heel mark resistance test regarding the antifouling properties was further performed, and the results are indicated in Tables 5 and 6.

(Heel Mark Resistance Test)

In accordance with JIS K3920, such a test was performed by attaching a test sample on each surface of a hexagonal test drum with the surface layer side up, placing a black rubber in the drum, and rotating the drum under the conditions equivalent to 10000 people. After applying water to the surface layer of the test sample after the test and wiped with a Kimwipe, the surface was visually observed, and then a case where dirt was not noticeable was evaluated as "good", and a case where the dirt was clearly noticeable was evaluated as "poor". Note that, in Reference Comparative Example 1, although an antifouling component of BYK (trade name)-SILCLEAN 3720 (polyether modified polydimethylsiloxane having a hydroxyl group) was included, the result of this test was "poor". The reason for this is considered that the hydroxyl groups contained in such a component were not consumed. As for the antifouling properties, the decorative film of Reference Comparative Example 1 may also have the sufficient antifouling properties in a case where the antifouling properties are not required under severe conditions such as the present test.

TABLE 5

| | Tg | Average particle size (μm) | Example 12 | Example 13 | Example 14 | Example 15 | Example 16 | Example 17 | Example 18 | Example 19 | Example 20 |
|---|---|---|---|---|---|---|---|---|---|---|---|
| ETERNAL COLL (trade name) UW-1005E | — | — | 20.39 | 24.94 | 24.39 | 22.71 | 21.30 | 18.85 | 17.61 | 20.61 | 20.49 |
| Art Pearl (trade name) C-800T | −13 | 6 | 15.66 | 19.16 | 18.74 | 17.45 | 16.37 | 14.48 | 13.53 | 15.84 | 15.74 |
| Takenate (trade name) WB-3936 | — | — | 18.35 | 5.69 | 7.32 | 10.22 | 14.32 | 21.27 | 26.43 | 18.56 | 18.44 |
| BYK (trademakr) - SILCLEAN 3720 | — | — | 1.71 | 2.10 | 2.05 | 1.91 | 1.79 | 1.58 | 1.48 | 0.62 | 1.23 |
| Tinuvin 292 | — | — | 0.29 | 0.36 | 0.35 | 0.33 | 0.31 | 0.27 | 0.25 | 0.30 | 0.30 |
| Tinuvin 1130 | — | — | 0.29 | 0.36 | 0.35 | 0.33 | 0.31 | 0.27 | 0.25 | 0.30 | 0.30 |
| ACRYSOL (trade name) RM-8W | — | — | 0.73 | 0.90 | 0.88 | 0.82 | 0.77 | 0.68 | 0.63 | 0.74 | 0.74 |
| Dynal (trade name) 604 | — | — | 0.12 | 0.15 | 0.15 | 0.14 | 0.13 | 0.11 | 0.11 | 0.12 | 0.12 |
| Carbodilite V-02 | — | — | 0.49 | 0.60 | 0.59 | 0.55 | 0.51 | 0.45 | 0.42 | 0.49 | 0.49 |
| 2-PA | — | — | 12.59 | 13.73 | 13.55 | 13.67 | 13.26 | 12.61 | 11.78 | 12.73 | 12.65 |
| Water | — | — | 29.37 | 32.03 | 31.63 | 31.89 | 30.94 | 29.42 | 27.49 | 29.69 | 29.51 |
| Content of resin beads with respect to 100 parts by mass of solid content (parts by mass) | | | 51 | 62 | 61 | 58 | 55 | 48 | 44 | 52 | 51 |
| Mass ratio (%) of Takenate (trade name) WB-3936 (Isocyanate) to ETERNA COLL (trade name) UW-1005E (binder precursor) | | | 120 | 30 | 40 | 60 | 90 | 150 | 200 | 120 | 120 |
| Content of BYK (trade name) - SILCLEAN 3700 (antifouling component) with respect to 100 parts by mass of solid content (parts by mass) | | | 1.4 | 1.7 | 1.7 | 1.6 | 1.5 | 1.3 | 1.2 | 0.5 | 1.0 |
| Elastic modulus of surface layer (MPa) | | | 20 | 15 | 16 | 18 | 29 | 41 | 44 | 23 | 29 |
| Needle scratch test | | | Good (70 g) | Good (60 g) | Good (60 g) | Good (70 g) | Good (70 g) | Good (70 g) | Good (80 g) | Good (60 g) | Good (70 g) |
| Nail scratch test | | | Good | Good | Good | Good | Good | Good | Good | Good | Good |
| 60-degree surface glossiness | | | 0.5 | 0.6 | 0.5 | 0.5 | 0.5 | 0.6 | 0.6 | 0.5 | 0.5 |
| Heel mark resistance test | | | Good | Good | Good | Good | Good | Good | Good | Good | Good |

TABLE 6

| | Tg | Average particle size (μm) | Reference Comparative Example 1 | Reference Comparative Example 2 | Reference Comparative Example 3 | Comparative Example 11 |
|---|---|---|---|---|---|---|
| ETERNAL COLL (trade name) UW-1005E | — | — | 26.80 | 20.74 | 29.40 | 13.00 |
| Art Pearl (trade name) C-800T | −13 | 6 | 20.59 | 15.94 | 21.18 | 9.99 |
| Takenate (trade name) WB-3936 | — | — | — | 18.67 | — | 39.02 |
| BYK (trademakr) - SILCLEAN 3720 | — | — | 2.25 | — | — | 1.09 |
| Tinuvin 292 | — | — | 0.39 | 0.30 | — | 0.19 |
| Tinuvin 1130 | — | — | 0.39 | 0.30 | — | 0.19 |
| ACRYSOL (trade name) RM-8W | — | — | 0.97 | 0.75 | — | 0.47 |
| Dynal (trade name) 604 | — | — | 0.16 | 0.12 | 0.18 | 0.08 |
| Carbodilite V-02 | — | — | 0.64 | 0.50 | 0.71 | 0.31 |
| 2-PA | — | — | 14.34 | 12.81 | 38.83 | 10.70 |
| Water | — | — | 33.47 | 29.88 | 9.71 | 24.97 |
| Content of resin beads with respect to 100 parts by mass of solid content (parts by mass) | | | 64 | 52 | 70 | 33 |
| Mass ratio (%) of Takenate (trade name) WB-3936 (Isocyanate) to ETERNA COLL (trade name) UW-1005E (binder precursor) | | | 0 | 120 | 0 | 400 |
| Content of BYK (trade name) - SILCLEAN 3700 (antifouling component) with respect to 100 parts by mass of solid content (parts by mass) | | | 1.8 | 0 | 0 | 0.9 |
| Elastic modulus of surface layer (MPa) | | | 15 | 24 | 25 | 88 |
| Needle scratch test | | | Good (50 g) | Good (50 g) | Good (100 g) | Good (70 g) |
| Nail scratch test | | | Good | Good | Good | Poor |
| 60-degree surface glossiness | | | 0.6 | 0.4 | 0.6 | 1.1 |
| Heel mark resistance test | | | Poor | Poor | Poor | Good |

Various variations of the above embodiments and examples will be apparent to those skilled in the art without departing from the basic principle of the present invention. In addition, various modifications and variations of the present invention will be apparent to those skilled in the art without departing from the spirit and scope of the present invention.

The invention claimed is:

1. A laminate comprising:

a substrate; and a surface layer having scratch resistance and matte properties that includes resin beads having an average particle size of approximately 1 micrometer or greater and approximately 20 micrometers or less, and having a glass transition temperature of higher than approximately-30° C. and lower than approximately 34° C., and a binder, wherein the surface layer contains the resin beads of less than approximately 75% by mass based on a total weight of the surface layer, and exhibits an elastic modulus of approximately 5 MPa or greater and approximately 65 MPa or less in a region other than the resin beads of the surface layer when the elastic modulus of the surface layer is measured using an atomic force microscope.

2. The laminate according to claim 1, wherein the surface layer has a 60-degree surface glossiness of 5.0 GU or less.

3. The laminate according to claim 1, wherein the binder contains a resin having a urethane bond.

4. The laminate according to claim 1, wherein the binder contains a resin having a carboxy group.

5. The laminate according to claim 1, wherein the binder includes a crosslinked product crosslinked with a crosslinking composition.

6. The laminate according to claim 1, which is used as an interior material or exterior material for buildings or vehicles.

7. The laminate according to claim 1, wherein the surface layer further contains an antifoulant.

8. The laminate according to claim 7, wherein the antifoulant contains a silicone resin having a urethane bond.

9. A surface coating composition comprising:

resin beads having an average particle size of 1 micrometer or greater and 20 micrometers or less and a glass transition temperature of higher than-30° C. and lower than 34° C.; and a binder precursor, wherein the resin beads are less than 75% by mass based on solid content of 100 parts by mass of the surface coating composition, and wherein a surface layer made from the surface coating composition exhibits an elastic modulus of 5 MPa or greater and 65 MPa or less in a region other than the resin beads of the surface layer when the elastic modulus of the surface layer is measured using an atomic force microscope.

10. The surface coating composition according to claim 9, wherein the binder precursor contains a resin having a urethane bond.

11. The surface coating composition according to claim 9, further comprising an antifoulant.

12. The surface coating composition according to claim 9, which is a water-based composition.

13. The surface coating composition according to claim 9, wherein a mass ratio of the water-based isocyanate to the binder precursor is 30% or greater and less than 400% in terms of solid content, and wherein the surface coating composition comprises 0.5 parts by mass or greater of the polyether-modified silicone having a hydroxyl group based on 100 parts by mass of solid content of the surface coating composition.

14. The surface coating composition according to claim 12, further comprising:

water-based isocyanate; and polyether-modified silicone having a hydroxyl group as the antifoulant.

15. The surface coating composition according to claim 12, wherein the binder precursor contains a resin having a carboxy group.

* * * * *